US008070341B2

(12) United States Patent  
Chinniah et al.

(10) Patent No.: US 8,070,341 B2  
(45) Date of Patent: Dec. 6, 2011

(54) LIGHT PIPE WITH UNIFORMLY LIT APPEARANCE

(75) Inventors: Jeyachandrabose Chinniah, Belleville, MI (US); Glenn McCarter, Ann Arbor, MI (US); Xiaolu Chen, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 221 days.

(21) Appl. No.: 12/338,187

(22) Filed: Dec. 18, 2008

(65) Prior Publication Data

US 2010/0157619 A1    Jun. 24, 2010

(51) Int. Cl.  
*F21V 7/04* (2006.01)

(52) U.S. Cl. ............................ 362/551; 362/555; 362/26

(58) Field of Classification Search .................. 362/551, 362/555, 26, 610, 608–609  
See application file for complete search history.

(56) References Cited

U.S. PATENT DOCUMENTS

| | | | |
|---|---|---|---|
| 4,422,719 A | 12/1983 | Orcutt | |
| 4,466,697 A | 8/1984 | Daniel | |
| 4,471,412 A | 9/1984 | Mori | |
| 5,432,876 A | 7/1995 | Appledorn et al. | |
| 5,584,556 A | 12/1996 | Yokoyama et al. | |
| 5,836,669 A * | 11/1998 | Hed | 362/92 |
| 5,857,761 A * | 1/1999 | Abe et al. | 362/551 |
| 5,915,855 A * | 6/1999 | Murase et al. | 40/546 |
| 6,286,970 B1 | 9/2001 | Egawa et al. | |
| 6,289,150 B1 * | 9/2001 | Zarian et al. | 385/31 |
| 6,367,941 B2 | 4/2002 | Lea et al. | |
| 6,601,984 B2 | 8/2003 | Yamamoto et al. | |
| 6,608,951 B1 | 8/2003 | Goldberg et al. | |
| 6,712,492 B2 | 3/2004 | Shimura et al. | |
| 6,741,788 B2 | 5/2004 | Steiner et al. | |
| 6,769,799 B2 | 8/2004 | Goto | |
| 6,836,611 B2 | 12/2004 | Popovic et al. | |
| 6,910,783 B2 | 6/2005 | Mezei et al. | |
| 7,347,611 B2 | 3/2008 | Kwon | |
| 7,478,941 B2 * | 1/2009 | Wu et al. | 362/612 |
| 2004/0141336 A1 | 7/2004 | West et al. | |
| 2004/0196648 A1 | 10/2004 | Franklin et al. | |
| 2005/0237761 A1 | 10/2005 | Lasota | |
| 2007/0058391 A1 | 3/2007 | Wilson et al. | |

FOREIGN PATENT DOCUMENTS

| | | |
|---|---|---|
| DE | 100 37 642 A1 | 2/2002 |
| DE | 20 2004 010 853 U1 | 9/2004 |
| DE | 103 56 483 A1 | 7/2005 |
| DE | 10 2004 046386 A1 | 4/2006 |

\* cited by examiner

*Primary Examiner* — Robert May  
(74) *Attorney, Agent, or Firm* — Fraser Clemens Martin & Miller LLC; James D. Miller

(57) ABSTRACT

A light pipe having substantially uniform brightness along a length thereof is disclosed. The light pipe includes a first end for receiving a plurality of light rays, a reflective portion for directing the received light rays in a pre-determined internal light pattern, wherein the reflective portion includes a plurality of reflective elements, and an emitting portion for emitting the light rays in a pre-determined light distribution pattern.

8 Claims, 3 Drawing Sheets

LIGHT PIPE WITH UNIFORMLY LIT APPEARANCE

FIELD OF THE INVENTION

The invention relates to lighting. More particularly, the invention is directed to a light pipe and a lighting system for providing a substantially uniform brightness along a length of the light pipe.

BACKGROUND OF THE INVENTION

Currently, short light pipes are used for fulfilling certain automotive exterior lighting functions by incorporating optics with light sources mounted at either one or both ends of the light pipe. Non-functional decorative light pipes are not commonly used in automotive applications. Alternatively, functional light pipes are optimized to produce a specific beam pattern to meet photometric requirements of functions such as parking lamp or tail Lamp, for example. The functional optimization typically overrides any consideration of uniform lit appearance of the light pipe.

However, the new trend in automotive lighting is to add non-functional light pipes for vehicle aesthetics. While ring-shaped light pipes inherently offer a uniform lit appearance, long straight or curved light pipe designs are very challenging to create the uniform lit appearance throughout an entire length of the light pipe, especially when a light source is mounted at only one end of the light pipe. In this case, the lit appearance of the light pipe is typically very bright in the region nearest the light source, and dimmer towards the other end. Such noticeably varying brightness along the length of the pipe at any viewing angle is preferably avoided to provide an acceptable appearance for the light pipe, since the sole aim of the light pipe is illumination styling and not an optical function.

It would be desirable to produce a light system including a light pipe wherein the light system provides a substantially uniform lit appearance along a length of the light pipe, while minimizing "hot spots" and noticeably varying brightness at light-coupling ends and curved portions of the light pipe.

SUMMARY OF THE INVENTION

Concordant and consistent with the present invention, a light system including a light pipe wherein the light system provides a substantially uniform lit appearance along a length of the light pipe, while minimizing "hot spots" and noticeably varying brightness at light-coupling ends and curved portions of the light pipe, has surprisingly been discovered.

In one embodiment, a light pipe having substantially uniform brightness along a length of the light pipe comprises: a first end for receiving a plurality of light rays; a reflective portion for directing the received light rays in a pre-determined internal light pattern, wherein the reflective portion includes a plurality of reflective elements; and an emitting portion for emitting the light rays in a pre-determined light distribution pattern.

In another embodiment, a light pipe having substantially uniform brightness along a length of the light pipe comprises: a first end for receiving a plurality of light rays; a reflective portion for directing the received light rays in a pre-determined internal light pattern, wherein the reflective portion includes a plurality of reflective elements, each of the reflective elements forming a protrusion; and an emitting portion for emitting the light rays in a pre-determined light distribution pattern.

In yet another embodiment, a lighting system comprises: a light source for emitting a plurality of light rays; a light pipe including: a first end for receiving the light rays; a reflective portion for directing the received light rays in a pre-determined internal light pattern, wherein the reflective portion includes a plurality of reflective elements; and an emitting portion for emitting the light rays in a pre-determined light distribution pattern; and an optics element for directing the light rays into the first end of the light pipe.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
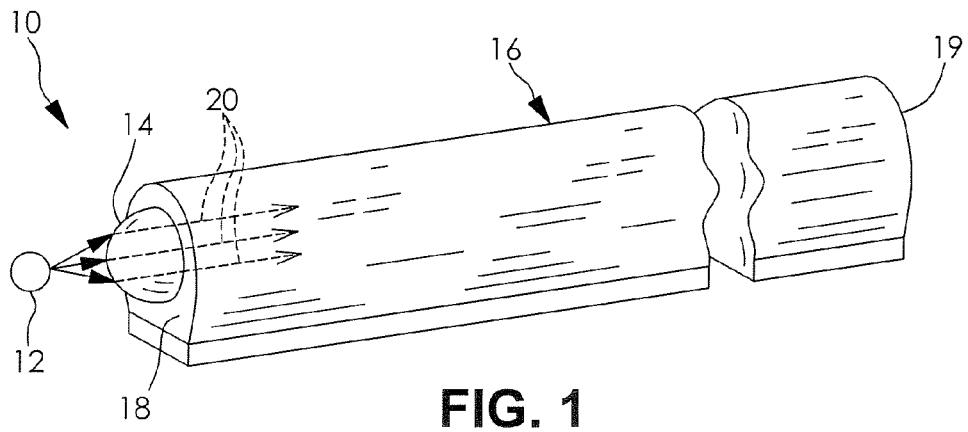
FIG. 1 is a fragmentary perspective view of a lighting system according to an embodiment of the present invention.

FIG. 1 illustrates a lighting system 10 according to an embodiment of the present invention. As shown, the lighting system 10 includes a light source 12, an optics element 14, and a light pipe 16. It is understood that the lighting system 10 may include additional components and features for securing the lighting system 10 to a vehicle, for example. Other components and features may be included, as desired.

The light source 12 illustrated is a light emitting diode (LED). Any LED, now known or later developed, may be used, as desired. However, other light sources such as bulbs may be used, as desired. As shown, a single light source 12 is disposed adjacent a first end 18 of the light pipe 16. It is understood that, in certain embodiments, an additional light source 12 may be disposed at a second end 19 of the light pipe 16. As a non-limiting example, a plurality of light rays 20 emitted from the light source 12 may propagate directly into at least one of the first end 18 and the second end 19 of the light pipe 12. However, it is understood that the light rays 20 emitted from the light source 12 may be directed and collimated by the optics element 14 before entering the light pipe 12.

The optics element 14 may be any optical device or system for at least one of directing, collimating, and refracting light rays. As such, the optics element 14 minimizes a "hot area" that typically appears near the in-coupling end of the light pipe 16, shown as the first end 18. In certain embodiments, the optics element 14 substantially collimates the light rays 20 and balances the distribution of the light rays 20 entering the light pipe 16.

As shown in FIG. 1, the optics element 14 is a partial area lens disposed adjacent the first end 18 of the light pipe 16, wherein at least a portion of the first end 18 is substantially planar. As a non-limiting example, the partial area lens is at least one of a convex lens and a near field lens. It is understood that the optics element 14 may have pre-determined characteristics for directing and collimating the light rays 20 in a pre-determined light pattern.

The light pipe 16 illustrated is formed from a substantially transparent and solid plastic or glass. However, other materials may be used, as desired. It is understood that the light pipe 16 may be formed from a flexible material. It is further understood that the light pipe 16 may be straight or curved. As such, the light pipe 16 is adapted to receive the light rays 20 from at least one of the first end 18 and the second end 19. In certain embodiments, the light pipe 16 has a length greater than 400 millimeters. However, the light pipe 16 may have any length, as desired.

Figure 2:
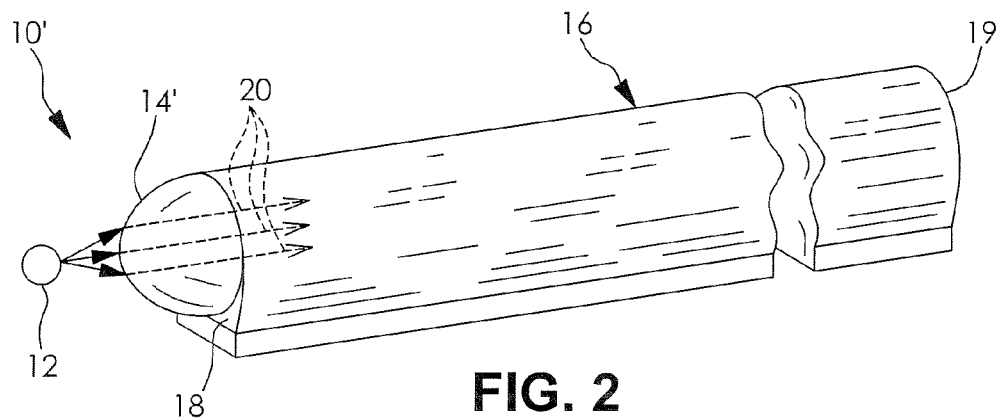
FIG. 2 is a fragmentary perspective view of a lighting system according to another embodiment of the present invention.

FIG. 2 illustrates a lighting system 10' according to another embodiment of the present invention similar to the lighting system 10 of FIG. 1, except as described below. Structure repeated from the description of FIG. 1 includes the same reference numeral. Variations of structure shown in FIG. 1 include the same reference numeral and a prime (') symbol. As shown in FIG. 2, the optics element 14' is a full area lens disposed adjacent the first end 18 of the light pipe 16, wherein the first end 18 is substantially covered by the full area lens. As a non-limiting example, the full area lens is at least one of a convex lens and a near field lens. It is understood that the optics element 14' may have pre-determined characteristics for directing and collimating light rays in a pre-determined light pattern.

Figure 3:
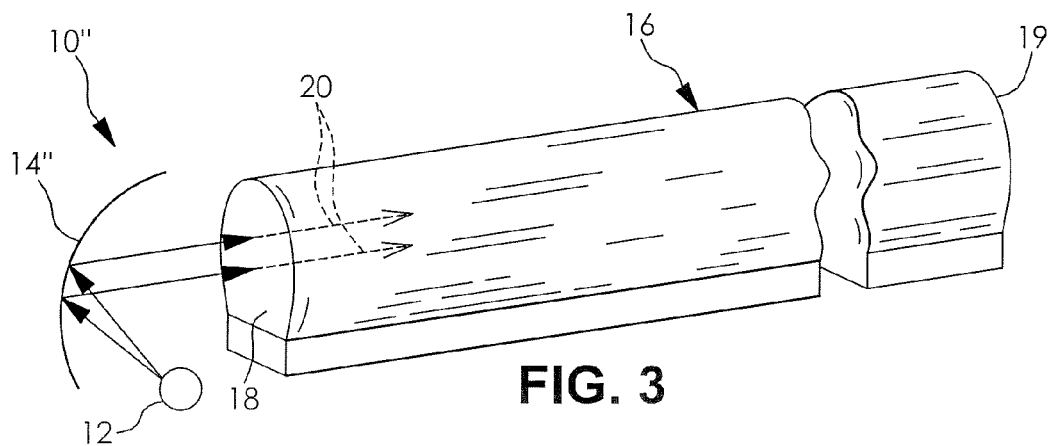
FIG. 3 is a fragmentary perspective view of a lighting system according to another embodiment of the present invention.

FIG. 3 illustrates a lighting system 10" according to yet another embodiment of the present invention similar to the lighting system 10 of FIG. 1, except as described below. Structure repeated from the description of FIG. 1 includes the same reference numeral. Variations of structure shown in FIG. 1 include the same reference numeral and a double-prime (") symbol. As shown in FIG. 3, the optics element 14" is a concave reflecting device for directing and substantially collimating the light rays into the first end 18 of the light pipe 16. It is understood that the optics element 14" may have pre-determined characteristics for directing and collimating light rays in a pre-determined light pattern. Other lenses and light directing devices may be used, as desired.

Figure 4:
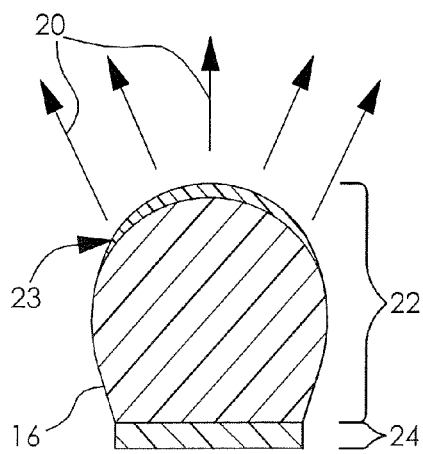
FIG. 4 is a cross sectional view of a light pipe according to an embodiment of the present invention.
Figure 5:
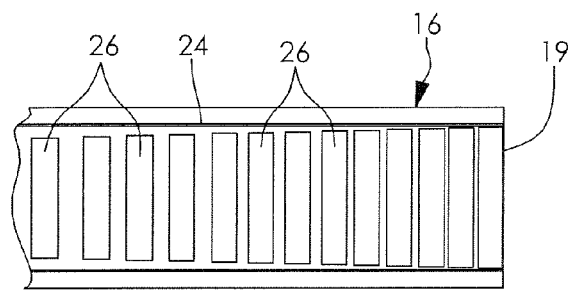
FIG. 5 is a fragmentary bottom elevational view of the light pipe of FIG. 4.

FIGS. 4 and 5 illustrate the light pipe 16 according to another embodiment of the present invention. As shown, the light pipe 16 includes an emitting portion 22 and a reflective portion 24. The emitting portion 22 is shown having a curved surface for directing the light rays emitted from the light pipe 16 in a pre-determined light pattern. However, the emitting portion 22 may have any shape and size, as desired. As shown, the emitting portion 22 includes a light control component 23. Specifically, the light control component 23 provides a means for bending and directing the light rays 20 into a desired light pattern or distribution. As a non-limiting example, the light control component 23 may be a coating, a film, a paint, or an optics element.

The reflective portion 24 includes a plurality of reflective elements 26 to reflect the light rays 20 in a pre-determined light pattern so the light rays 20 exit the light pipe 16 through the emitting portion 22. In certain embodiments, the reflective elements 26 may be formed from at least one of a texture, an embedded material, and paint for diffusing and reflecting the light rays 20. As such, material characteristics such as texture density and reflectivity may be varied to achieve a substantial uniformity in the perceived brightness of the light emitted from the light pipe 16 along a length thereof.

As shown in FIG. 5, the reflective elements 26 are spaced apart in a pre-determined spacing pattern. Specifically, a spacing of the reflective elements 26 varies such that the spacing between two of the reflective elements 26 at a light entrance end is wider than the spacing between two of the reflective elements 26 at an opposite end of the light pipe 16. Additionally, a width of the reflective elements 26 measured in a direction lateral to a longitudinal axis of the light pipe 16 varies such that the width of one of the reflective elements 26 at a light entrance end is narrower than the width of one of the reflective elements 26 at an opposite end of the light pipe 16. It is understood that any spacing pattern may be used. It is further understood that each of the reflecting elements 26 may have any width and spacing including a constant width or spacing.

Figure 6:
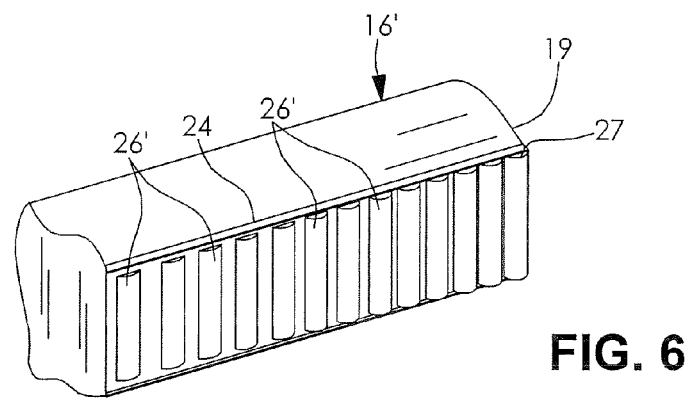
FIG. 6 is a bottom perspective view of a light pipe according to another embodiment of the present invention, shown in a straight formation.
Figure 7:
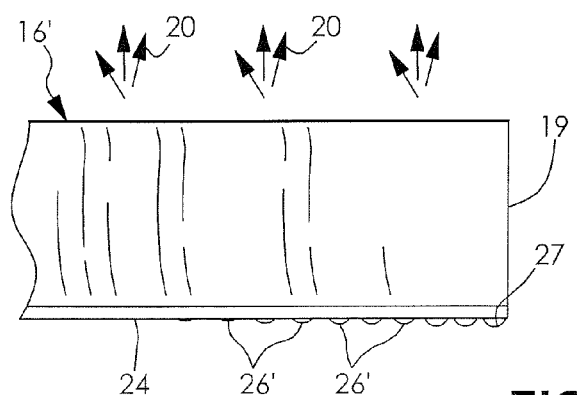
FIG. 7 is a fragmentary side elevational view of the light pipe of FIG. 6.
Figure 8:
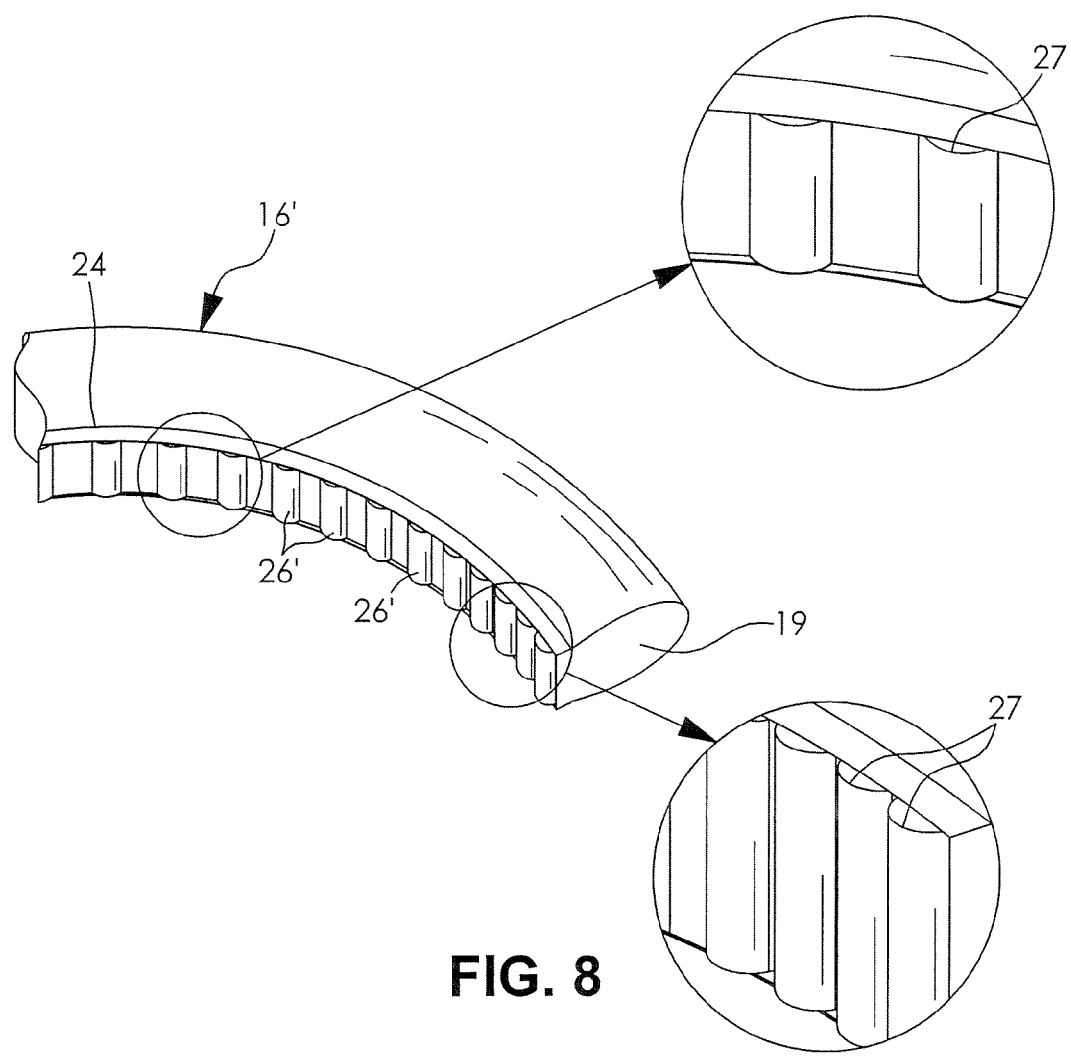
FIG. 8 is a fragmentary perspective view of the light pipe of FIG. 6, shown in a curved formation.

FIGS. 6-8 illustrate a light pipe 16' according to another embodiment of the invention similar to the lighting system 10 of FIGS. 4 and 5, except as described below. Structure repeated from the description of FIGS. 4 and 5 includes the same reference numeral. Variations of structure shown in FIGS. 4 and 5 include the same reference numeral and a prime (') symbol. As shown, each of the reflective elements 26' is a protrusion having a substantially arcuate inner surface 27 for reflecting and directing the light rays 20 in a desired internal light pattern. Specifically, each of the reflective elements 26' form a semi- or partially-circular protrusion or "tooth" protruding outside the light pipe material. However, it is understood that the shape and size of the reflective elements 26' may be modified to obtain a desired lit appearance at various viewing angles relative to the emitting portion 22 of the light pipe 16' such as a uniformly lit appearance.

In order to preserve uniformity along the length of the light pipe 16', a depth of each of the reflective elements 26' is progressively increased and the spacing between two neighboring reflective elements 26' (pitch) is progressively decreased from an end where light enters the light pipe 16 to an opposite end. Additionally, a width of each of the reflective elements 26' along the circumference of the light pipe 16 may also vary. As a non-limiting example, the width of each of the reflective elements 26' may be narrower at the light entrance end and wider at the opposite end.

In use, the light source 12 emits the light rays 20. In certain embodiments the optics element 14, 14' directs the light rays 20 into the light pipe 16, 16'. However, the light rays 20 may enter the light pipe 16, 16' directly. As such, the light rays 20 travel through the light pipe 16, 16' by the principle of total internal reflection. Specifically, the reflective elements 26, 26' direct the light rays 20 in the pre-determined internal lighting pattern such that the light rays 20 propagate through the length of the light pipe 16, 16', while exiting only through the emitting portion 22 of the light pipe 16, 16'. It is understood that in certain embodiments, the inner surface 27 of each of the reflective elements 26, 26' reflects the light rays 20 based upon a shape, a size, a curvature, and a surface area of the inner surface 27. It is further understood that a spacing of each of the reflective elements 26, 26' relative to another of the reflective elements 26, 26' regulates the internal reflection of the light rays 20 along the length of the light pipe 16, 16'.

Accordingly, the light system 10, 10' including the light pipe 16, 16' of the present invention provides a substantially uniform lit appearance along a length of the light pipe 16, 16' while minimizing "hot spots" and noticeably varying brightness at light-coupling ends and curved portions of the light pipe 16, 16'. Besides offering unique styling opportunities, the light system 10, 10' minimizes a package size and minimizes a complexity of thermal management in certain embodiments by using a single light source 12. Although the invention focuses on automotive applications, this technology is also be applicable for other applications in other industries such as advertising, indications, signs, and so on.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A light pipe having a substantially uniform brightness along a length thereof, the light pipe comprising:
    a first end for receiving a plurality of light rays and a second end spaced from the first end;
    a reflective portion for directing the received light rays in a pre-determined internal light pattern, wherein the reflective portion includes a plurality of reflective elements, and each of the reflective elements is a protrusion, a depth of at least one of the reflective elements adjacent the first end is less than a depth of at least another of the reflective elements adjacent the second end of the light pipe, a lateral width of at least one of the reflective elements adjacent the first end is less than a lateral width of at least another one of the reflective elements adjacent the second end of the light pipe, the lateral width measured in a direction orthogonal to a longitudinal axis of the light pipe, and the reflective elements at the first end of the light pipe are spaced wider than the reflective elements at the second end of the light pipe;
    an emitting portion for emitting the light rays in a pre-determined light distribution pattern; and
    an optics element for collimating at least a portion of the light rays and directing the light rays into the first end of the light pipe.

2. The light pipe according to claim 1, wherein the reflective elements are formed from at least one of a coating, a film, a paint, and an optics element.

3. The light pipe according to claim 1, wherein the emitting portion includes at least one of a curved surface for directing the light rays in a pre-determined light distribution pattern and a light control component for directing the light rays in a pre-determined light distribution pattern.

4. The light pipe according to claim 1, wherein each of the reflective elements includes at least one of an arcuate inner surface, a semi-circular inner surface, and a partially-circular inner surface.

5. The lighting system according to claim 1, wherein the optics element is a near field lens covering at least a portion of the first end.

6. The lighting system according to claim 1, wherein the optics element is a convex lens covering at least a portion of the first end.

7. The lighting system according to claim 1, wherein the optics element is a concave reflecting device.

8. The lighting system according to claim 1, wherein the lateral widths of the reflective elements increase sequentially along the length of the light pipe from the first end to the second end of the light pipe.

* * * * *